Nov. 15, 1966  M. D. PARMENTER  3,284,924
TEACHING AID

Filed March 8, 1965  2 Sheets-Sheet 1

INVENTOR
MORGAN D. PARMENTER

BY: Fetherstonhaugh & Co
ATTORNEYS

Nov. 15, 1966     M. D. PARMENTER     3,284,924

TEACHING AID

Filed March 8, 1965     2 Sheets-Sheet 2

INVENTOR
MORGAN D. PARMENTER

BY: Fetherstonhaugh & Co.
ATTORNEYS

United States Patent Office 3,284,924
Patented Nov. 15, 1966

3,284,924
TEACHING AID
Morgan D. Parmenter, 56 Glencairn Ave.,
Toronto, Ontario, Canada
Filed Mar. 8, 1965, Ser. No. 437,816
2 Claims. (Cl. 35—9)

This invention relates to an educational aid in the form of a teaching machine that is especially useful in programed learning or programed teaching.

Programed learning, or programed teaching, has received a good deal of attention during recent years. The basis of the technique as a general rule is to set up material to be learned or taught in small steps with one step leading on to the next step; i.e. gradual increments leading to subject mastery, requiring, as a rule, an active response to each increment on the part of the learner, immediate feed back so as to indicate to the learner whether the response was right or wrong, and a self-pacing arrangement so that the learner can proceed at his own rate.

Teaching machines have been developed to embody these principles. Some are in the form of books especially arranged. Others are machines that use rolls, cards, etc. to present programs of learning to the student. Most of the machines available are costly in terms of initial outlay and/or in terms of programs because at least the portion of the printed program that has an answer written on it can only be used once.

The present invention is a machine of the roll type, and its principal advantage over and above those of a similar type in the prior art is that it permits the reuse of the program rolls by reason of the fact that the written answers are automatically erased as the device is used so that by merely re-running the program roll through the machine it can be used over and over again. The invention also leads to economies by reason of the fact that programs can be printed on both sides of the program roll.

It is therefore an object of the invention to provide an inexpensive teaching machine for programed learning that uses a program roll wherein the answers are written by the user but wherein the roll can be used over and over again.

It is a further object of the invention to provide a teaching machine for program or other learning of the roll type wherein program can be carried by both sides of the roll and wherein both sides can be used in turn without rewinding or removing the roll.

With these and other objects in view, a teaching machine according to the present invention comprises a housing, a program roll having questions and answers thereon, a first guide means for the program roll, a continuous answer belt means upon which answers can be written, a second guide means for the answer belt, operating means for moving the program roll over its guide means, the first guide means for the program roll and the second guide means for the answer belt means being inter-connected whereby the operating means for moving the program roll over the first guide means simultaneously moves the answer belt means over the second guide means. The housing has a first window opening through which questions and answers on the program roll can be serially viewed as the program roll is moved over the guide means. It also has a second window opening through which answers can be written on the answer belt means. An erasure means is provided for the answer belt means between the window opening for the answer belt means to erase answers written on the answer belt means through the window opening to the answer belt means. The invention will be clearly understood after reference to the following detailed specification read in conjunction with the drawings.

Figures 1, 2:
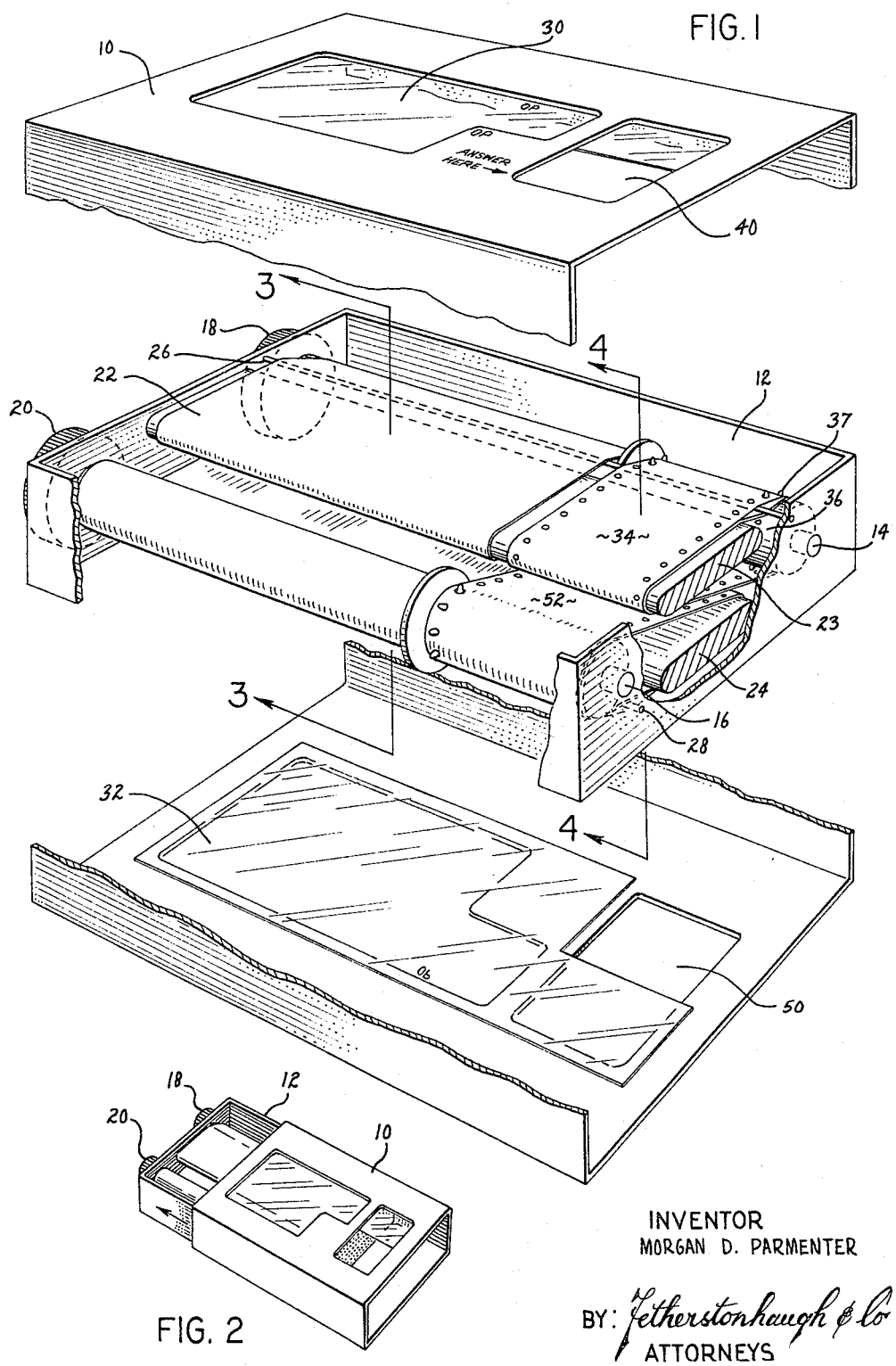
FIGURE 1 is an exploded perspective view of a teaching machine according to the present invention.
FIGURE 2 is a view of the teaching aid with a program frame partially inserted therein.
Figure 3:
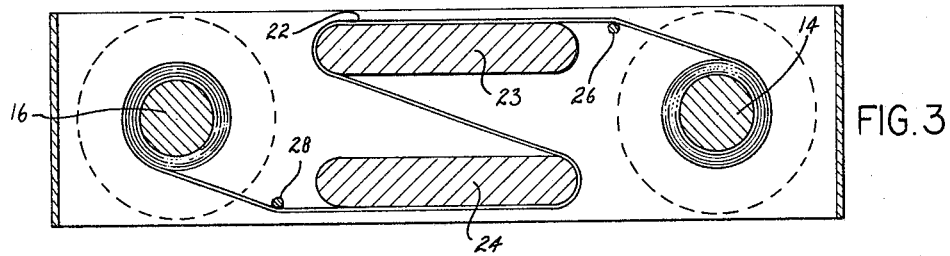
FIGURE 3 is a sectional view along the line 3—3 of FIGURE 1.
Figure 4:
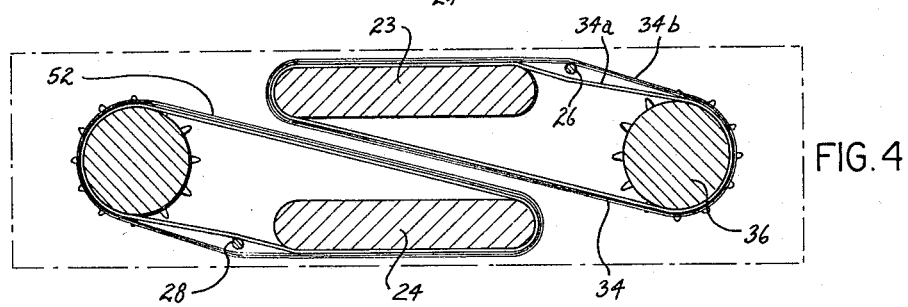
FIGURE 4 is a sectional view along the line 4—4 of FIGURE 1.

The teaching machine illustrated in the drawings comprises a housing formed from a sleeve-like member 10 which slidably receives the frame 12, as illustrated clearly in FIGURE 2, wherein the frame member 12 is being withdrawn from the sleeve member in the direction of the arrow. By withdrawing the frame from the sleeve one can conveniently change the program rolls to be described later.

FIGURE 1 is an exploded view of the teaching machine wherein the sleeve-like member 10 has been broken to show the arrangement of the parts. The frame 12 has also been broken away along the forward and side wall to illustrate construction.

The frame member 12 supports the rotatably mounted spindles 14 and 16 in opposed ends thereof. Each of the spindles has a knob 18 and 20 respectively on its free end for the purpose of manually rotating it, as will be apparent later.

The numeral 22 refers to a program roll upon both sides of which are serially written a series of questions and answers. The roll 22 extends around a roll guide means that includes a portion of the spindles 14 and 16, transversely extending support tables 23 and 24 and transversely extending wires 26 and 28. By rotating either knob 18 or knob 20 the program roll 22 can be advanced in either direction to serially present questions and answers arranged along the length thereof through the windows 30 and 32 on opposed sides of the housing sleeve 10. In use, as will be referred to later, the program roll 22 is first advanced fully in one direction by, say, the knob 18 to present the questions and answers on one side of the program roll through the window 30 for use by a learner. Subsequently, and after the program roll 22 has been moved its full extent by the knob 18, it is moved in the opposite direction by means of the knob 20 to display the questions and answers written on the opposite side thereof through the window 32 on the other side of the housing. This will be referred to again later.

As indicated above, it is an important step in programmed learning or teaching that the learner write down the answer to a question, and in this connection the learner writes the answer to a question appearing on, say, one side of the program roll through the window 30 on a continuous answer belt 34 which travels around a guide means that consists of a roll 36 mounted on the spindle 14 and the support table 23. Teeth 37 on roll 36 positively engage with a series of holes along each side of the continuous answer belt 34.

The spindle 14 being continuous transversely of the frame member 12, the guide means for the program roll 22 are positively inter-connected with the guide means for the continuous answer belt 34 so that the program roll 22 and the answer belt 34 move simultaneously.

Questions and answers are serially arranged on the program roll 22 which carries appropriate markings to permit a user to advance the program roll, by rotating the knob 18, from the spindle 16 to the spindle 14 in increments to present each question in turn through the window 30 so that the user can write his answer to each question through an answer window 40 on an underlying exposed portion of the answer belt 34.

Figure 5:
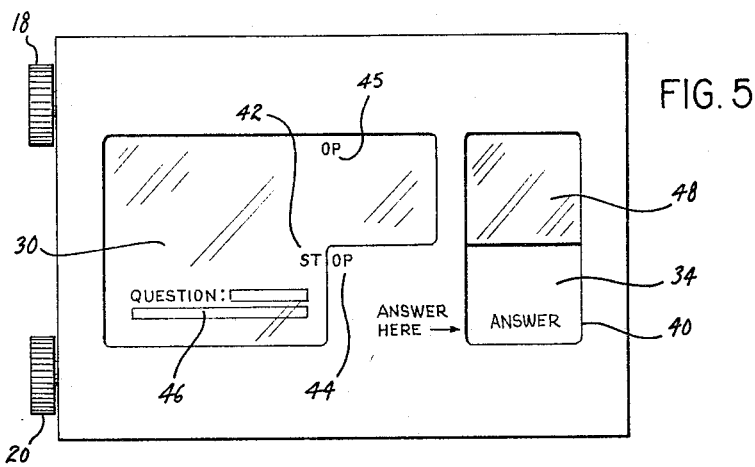
FIGURE 5 is a top view of the exterior of the housing showing a question and the answer space.
Figure 6:
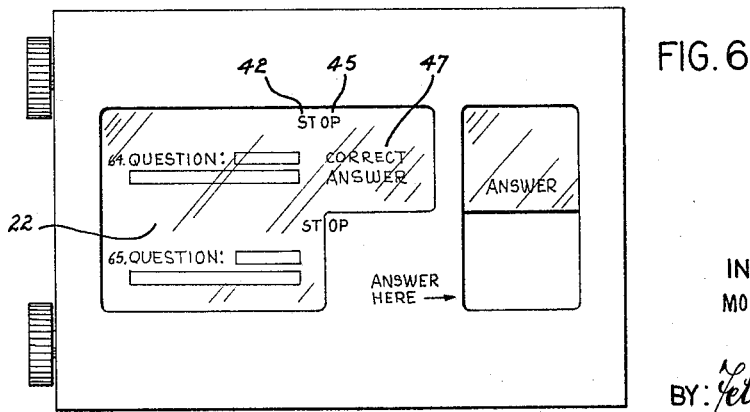
FIGURE 6 is a similar view of the exterior of the housing showing the question advanced in its window opening to where its printed answer also appears and the manner in which the answer can be checked with the one written in the answer window.

In the foregoing connection the program roll 22 carries a series of spaced apart letters "ST," the first two letters of the word "stop," as indicated by the numerals 42 on FIGURES 5 and 6. The window opening 30 has an opaque shoulder section at the lower right hand portion which carries the letters "OP," as indicated by the numerals 44, and which are adapted to align with the letters "ST" (numeral 42) on the program roll to form the complete word "stop," as indicated in FIGURE 5. A user advances the program roll by means of the knob 18 until the letters "ST" on the program roll align with the letters "OP" on the marginal portions of the window opening 30. In this position there is a question to be answered on the lower portion 46 of the roll 22. The user of the device writes the answer to this question on the portion of the answer belt 34 that is accessible through the open lower portion of the window 40. In this connection the answer window 40 has only its lower portion open so that the answer belt thereunder is accessible. The upper portion is covered with a transparent film of plastic 48, such as cellophane.

After the user has written the answer to the question appearing in the lower portion 46 of window 30 on the answer belt 34 through the open lower portion of the answer window 40, the program roll is advanced by operating the knob 18 until the letters "ST" above the question just answered line up with the letters "OP" 45 on the transparent cover for window 30, as indicated in FIGURE 6. In this position the correct answer to the question just answered appears in the upper right portion 47 of the window 30 and this can be compared with the written answer appearing through the transparent covering 48 of the answer window 40, to which position the answer just previously written through the open lower portion of the answer window has advanced by reason of the rotation of the driving roll 36 which is directly mounted on the spindle 14. The next question to be answered appears through the lower portion of window 30 and it likewise has an associated pair of letters "ST" that are lined up with the letters "OP" on the window margin.

In use, the process is repeated and a series of questions written on the roll 22 are presented through the window 30, the answers written on the answer belt 34 through the open lower portion of the window 34 and checked as the program roll and answer belts are advanced as described above.

As indicated above, the answer belt 34 is continuous and erasure means are provided on the travel of the answer belt for erasing the answers that are written on the belt as it travels between the window 40. This is a most important feature of the invention because it permits the program roll to be used over and over again. The user by indicating his answer does not place a permanent marking on the program roll.

The answer roll illustrated in the embodiment of the invention shown in the drawings is of the well known magic slate type. Writing slates which comprise a first sheet of cardboard coated with a densely coloured wax-like composition overlaid with a waxed, oiled, plastic, cellophane or like sheet material that is of a cloudy, translucent nature, such that a blank surface is presented to view, are well known. When one takes a stylus and scribes over the translucent sheet, the non-drying light-tack coloured composition on the underlying cardboard adheres to the underside of the translucent material to make the scribed line visible. It becomes invisible again when the translucent sheet is separated from the underlying coated sheet. The general device of the magic writing pad is well known. The consistency of the non-drying, light-tack, coloured adhesive covering on the cardboard is variable but, by way of example, following is one well known formula:

| | | |
|---|---|---|
| Beeswax | parts by volume | 4 |
| Venus turpentine | do | 9 |
| Lard | parts | 4 |
| China clay | parts by volume | 3½ |
| Carbon black | do | 1 |
| Mineral oil | do | 2 |

The foregoing is by way of example. The general phenomenon of magic slates is well known and detailed reference to them is not intended in this application. The principle, however, is used in achieving an erasure means for erasing the answers on the answer belt 34 as it progresses from the window and back to the window again in its continuous movement.

Answer belt 34 is a composite belt comprised of a first sheet 34a having a non-drying, light-tack, coloured adhesive coating of the type commonly used in magic slates referred to above and a cellophane or like translucent writing screen 34b of the type used in magic slates referred to above. The sheets 34a and 34b are normally in face to face contact but are separated at one point in their travel by the transversely extending wire rod 26. In use, when a user writes an answer on the answer belt through the open bottom portion of the window 40, he scribes on the cellophane layer 34b of the answer belt. This causes the non-drying, light-tack wax, coloured adhesive on the adjacent surface of the layer 34a to adhere to the sheet 34b to make the scribed line visible through the translucent sheet 34b. It remains so as the answer belt is advanced to move the answer up to the covered top portion 48 of the window 40 where it is checked with the correct answer on the program roll, as indicated above. After checking the answer belt proceeds in its continuous movement about its guide means as dictated by the movement of the knob 18 and the layer 34b is separated from the layer 34a by the rod 26 to erase the answer. The two sheets come together again with the answer erased and are progressively advanced for reintroduction to the open bottom portion of the window 34 to receive further answers. It will be noted that the table 23 forms a support for the answer belt as answers are scribed onto it.

As indicated above, it is a feature of this invention that a question program can be included on both sides of the program roll, and in this connection once the program roll has been advanced until it is substantially fully wound on the spindle 14 by means of the knob 18 to expose the program on one side of the program roll visible through the opening 30, the device can be turned over and the program roll returned to spindle 16 by operation of the knob 20 to expose the opposite side of the program roll upon which the program can be continued. In this case the questions are visible through the window 32 on the under side of the housing and the answers are written through a window 50 onto a second answer belt 52, which is identical to the answer belt 34 and is mounted in an identical fashion, with the exception that it is operated from the spindle 16 through the knob 20 and its guide means include the table 24. Detailed numbering of the various parts and explanation of the operation of the device in reverse will not be carried out because it is the same as described above and to do so would unnecessarily burden the application. It will be apparent, however, that by providing the window openings on both sides of the casing and means for rotating the roll in both directions that a substantial economy is effected because one program roll can carry double the questions. While two answer belts have been illustrated, it will be apparent that a single answer belt extending over both of the tables 23 and 24 to expose it through both of the windows 48 and 50 could be used to the same end.

From the above the invention and its use are apparent. The applicant does not intend to limit his invention in scope to the embodiments shown.

What I claim as my invention is:

1. An educational device comprising a housing, a program roll having questions and answers in serial arrangement thereon, a first guide means for said program roll, continuous answer belt means upon which answers to questions on said program roll can be written, a second guide means for said continuous answer belt means, operating means for moving said program roll over said first guide means, said first guide means and said second guide means being operatively inter-connected whereby said operating means as it moves said program roll over said first guide means simultaneously moves said answer belt means over said second guide means, a first window opening in said housing to serially expose questions and answers on said program roll, a second window opening in said housing through which answers to questions appearing on said program roll can be written on said answer belt means and compared for correctness, and erasure means on said second guide means intermediate said second window for erasing answers written on said answer belt means through said second window, said answer belt means including a composite belt comprised of a first sheet having a non-drying, light-tack, coloured adhesive coating and a translucent writing screen, said first sheet being adapted to adhere to said writing screen where the two layers are in overlying relation to each other and where scribing pressure is applied to the screen, said coloured adhesive being visible through said screen where it is caused to adhere to said screen whereby one can make a scribed line visible through said screen, said screen being adapted to break adhesive contact with said first sheet whereby to erase said scribed line from view through said screen and in which said erasure means comprises means for temporarily separating said first sheet and said screen to break any adhesive contact that may exist between them and erase any scribed lines apparent from such adhesive contact.

2. An educational device as claimed in claim 1, in which said program roll has questions and answers on both the first and the second side thereof, said first window opening being adapted to expose questions and answers on the first side only of said program roll, said housing having a third window opening adapted to expose questions and answers on the second side only of said program roll, said operating means for moving said program roll over said first guide means being adapted to do so in both directions to serially present questions and answers on the first side of said program roll through said first window opening when moving the program roll in one direction and to serially present questions and answers on the second side of said program roll through said third window opening when moving said program roll in the opposite direction, said housing having a fourth window opening through which answers to questions on the second side of said program roll can be written on said answer belt means and compared for corrections with answers appearing on the second side of said program roll, said second window opening being adapted to permit the writing of answers on said answer belt means as aforesaid in claim 1 which appear only on the first side of said program roll.

References Cited by the Examiner

UNITED STATES PATENTS

| | | | |
|---|---|---|---|
| 382,705 | 5/1888 | Kane | 36—61 |
| 1,227,205 | 5/1917 | Sartakoff | 35—62 |
| 2,837,839 | 6/1958 | Fernbach | 35—76 |
| 3,153,862 | 10/1964 | Sawyer | 35—9 |
| 3,237,231 | 3/1966 | Zink | 15—102 |

EUGENE R. CAPOZIO, *Primary Examiner.*

S. M. BENDER, *Assistant Examiner.*